3,375,259
DIFLUORAMINO COMPOUNDS
James Andrew Gibson, Prestwick, and James Brown Parker and James Grigor, Kilwinning, Scotland, assignors to Imperial Chemical Industries Limited, London, England, a corporation of Great Britain
No Drawing. Filed Apr. 14, 1964, Ser. No. 359,796
Claims priority, application Great Britain, Apr. 17, 1963, 15,211/63
19 Claims. (Cl. 260—309.7)

This invention relates to new difluoramino compounds useful as propellant explosives, or constituents thereof, and the preparation of such compounds.

The compounds of the present invention may be represented by the following general structural formula

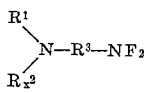

where:

$R^1$ represents a monovalent or divalent atom or group having an electron attracting atom or group adjacent to the nitrogen atom which may be, for example, carbonyl, halogeno, imino, nitro, difluoramino, mono or bis-difluoraminomethylene.

$R^2$ represents an electron attracting group as $R^1$ or is hydrogen, hydroxyl, alkyl, aryl, alkoxy, or a substituted alkyl, aryl or alkoxy group or a cyclic residue forming a cyclic structure with $R^1$.

$x$ represents 0 or 1 as $R^1$ is divalent or monovalent.

$R^3$ represents an alkylene group or a substituted alkylene group in which the substituent is an alkyl, alkoxy, or substituted alkyl or alkoxy, difluoramino or nitro group, and $R^1$, $R^2$ and $R^3$ are such that the ratio of carbon atoms to difluoramino groups is not more than 6:1.

Compounds having the above structure which are especially valuable as propellants include N,N′-bis(difluoraminomethyl)urea, tris(difluoraminomethyl)urea, tetrakis(difluoraminomethyl)urea, N - (difluoraminomethyl)-acetohydroxamic acid, ethyl N-difluoraminomethyl carbamate, ethyl N-difluoraminomethyl-N-fluoro carbamate, N-difluoraminomethyl-N′-nitrourea, N,N′-bis(difluoraminomethyl) - N′-nitrourea, tetrakis(difluoraminomethyl)-glycoluril, 1,3 - bis(difluoraminomethyl)imidazolidine-2-one, N′ - difluoraminomethyl - N,N - difluorourea, N-methoxy - N,N′ - bis(difluoraminomethyl)urea, N,N′-bis(difluoraminomethyl)-N-nitroguanidine.

The compounds of the invention may be prepared by reacting a compound containing an NH group having the general formula $R^1NHR_x^2$ where $R^1$, $R^2$ and $x$ are as previously defined, with a difluoramino alcohol having the formula HO—$R^3$—$NF_2$ where $R^3$ is as previously defined, in the presence of a strongly water-absorbent or water-reactive substance.

The general reaction for a compound containing one—NH group may be represented as

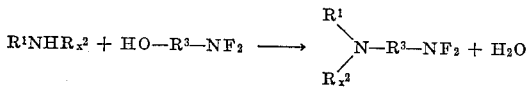

where $R^1$, $R^2$, $R^3$ and $x$ have the meanings previously given.

Compounds of the formula $R^1NHR_x^2$ in which $R^2$ is hydrogen or is a group having one or more amino substituent groups, can react with further difluoramino alcohol to give compounds with two or more difluoramino substituents.

The compound $R^1NHR_x^2$ may, for example, be urea, nitrourea, acetohydroxamic acid, ethyl carbamate, ethyl N-fluorocarbamate, glycoluril, imidazolidine-2-one, N,N-difluorourea, methoxyurea, or nitroguanidine. It is, in some cases, necessary or advantageous for this compound to be one in which $R^2$ is a group which, during the reaction, becomes separated by hydrolysis from the nitrogen atom and is replaced by hydrogen. Groups which may be thus hydrolysed include formyl and acetyl in compounds in which $R^1$ is an amido or substituted amido group.

The difluoramino alcohol may be added as such to the reaction mixture or it may be prepared in situ from difluoramine and the corresponding aldehyde. For example, reaction of difluoramine with formaldehyde gives difluoramino-methanol. The difluoramine, the aldehyde and the compound containing the NH group are preferably refluxed together to form the difluoramino alcohol before the water-absorbent or water-reactive substance is added.

The invention will be more clearly understood by reference to the following examples in which all parts and percentages are by weight. The products prepared in these examples all had explosive properties indicative of their suitability as constituents of propellant explosives. For example, they all flashed on ignition with a bright white flame and exploded spontaneously when heated to 150–300° C.

*Example 1*

4 parts difluoramine, generated by the acid hydrolysis of 5 percent aqueous N,N-difluorourea solution, were refluxed at −80° C. on to a solid mixture of 2 parts urea and 1 part paraformaldehyde for 3 hours under a nitrogen atmosphere. 4 parts of 96 percent $H_2SO_4$ were added dropwise to the reaction mixture over a period of 5 minutes and difluoramine reflux continued for a further 6 hours. Excess difluoramine was allowed to vent off in a slow stream of nitrogen and the reaction product mixture poured over 100 parts crushed ice. The aqueous mixture was extracted 5 times with 10 parts diethyl ether and the ethereal solution was dried for 24 hours over anhydrous sodium sulphate. The ether was then removed under a pressure of 600 millimetres mercury and the residue recrystallised from ligroin/ethanol to give 3.1 parts of a crystalline solid. This crystalline solid was found to have a sharp melting point of 162° C. and analysis showed that it contained 19.4% carbon, 3.1% hydrogen, 29.6% nitrogen and 39.8% fluorine. This analysis was in accord with the theoretical composition of N,N′-bis(difluoraminomethyl)urea, $NF_2CH_2NHCONHCH_2NF_2$, which requires 18.9% carbon, 3.2% hydrogen, 29.5% nitrogen and 40.0% fluorine.

On ignition the product flashed with a bright white flame. When heated at a rate of 5° C. per minute in an open-ended glass tube, it exploded at 168° C. It failed to explode when a ½ kg. mild steel hammer was dropped from a height of 10 centimetres on to a thin layer of the powder on a mild steel anvil, but exploded when the hammer drop was increased to 20 centimetres. The product was unreactive in admixture with commonly used propellant ingredients such as aluminum powder, ammonium perchlorate, nitrocellulose and a nitroglycerine casting liquid (nitroglycerine, triacetin, 2-nitrodiphenylamine—80/19/1) when maintained at 70° C. for 7 days.

*Example 2*

Difluoraminomethanol used in this reaction was prepared by refluxing difluoramine at −80° C. on to paraformaldehyde for 2 hours in a nitrogen atmosphere. 8 parts of 96 percent sulphuric acid were added dropwise over 5 minutes to a mixture of 0.3 part urea and 0.3 part difluoraminomethanol. The mixture was stirred for 1 hour and then poured over crushed ice. 0.41 part of a white powder product was isolated as described in Example 1 and was found by infra-red spectroscopic analysis to be identical with the N,N'-bis(difluoraminomethyl)urea formed in Example 1.

*Example 3*

A mixture of 2 parts methylene diurea and 3 parts paraformaldehyde was refluxed at −80° C. under a nitrogen atmosphere for 6 hours with 20 parts difluoramine. 20 parts 96 percent sulphuric acid were then added and the difluoramine reflux continued for a further 6 hours, and the product was then isolated as described in Example 1. After two recrystallisations from acetone/ligroin the product melted at 162° C. and was identified by infra-red spectroscopic analysis and mixed melting point as N,N'-bis(difluoraminomethyl)urea, as formed in Example 1.

*Example 4*

A mixture of 1 part formylurea and 3 parts paraformaldehyde was refluxed at −80° C. under a nitrogen atmosphere for 2 hours with 10 parts difluoramine. 10 parts 96 percent sulphuric acid were added and the difluoramine reflux continued for a further 5 hours, and the product was then isolated as described in Example 1. After recrystallisation from chloroform the product melted at 162° C. and was identified by infra-red spectroscopic analysis and mixed melting point as N,N'-bis(difluoraminomethyl)urea, as formed in Example 1.

*Example 5*

4 parts of difluoramine were refluxed at −80° C. for 4 hours on to a mixture of 1.0 part nitrourea and 2.7 parts of 37 percent aqueous formaldehyde solution. The mixture was agitated using a magnetic stirrer. 7.0 parts of 96 percent sulphuric acid were then added dropwise and difluoramine reflux continued for a further 4 hours. The product was isolated as described in Example 1. After two recrystallisations from alcohol/ligroin, 0.8 part of an off-white solid product M.P. 84–7° C. was obtained which was shown by elemental analysis to contain 14.4% carbon, 1.9% hydrogen, 32.9% nitrogen and 24.6% fluorine. This analysis was in reasonable agreement with the theoretical product of monosubstitution of the nitrourea, for example the compound N-difluoraminomethyl-N'-nitrourea which requires 14.1% carbon, 2.4% hydrogen, 32.9% nitrogen and 22.4% fluorine.

*Example 6*

4 parts of difluoramine were refluxed at −80° C. for 4 hours on to a mixture of 1.0 part of nitrourea and 2.7 parts of 37 percent aqueous formaldehyde. 7.3 parts of 96 percent sulphuric acid were added and difluoramine reflux continued for a further 4 hours. Treatment of the residual mixture as described in Example 1 gave 0.8 part of a brownish-white solid which was recrystallised from alcohol/ligroin. The recrystallised solid had a melting point of 69–72° C. and elemental analysis showed that it contained 16.2% carbon, 2.7% hydrogen, 31.1% nitrogen and 32.2% fluorine. This analysis was in reasonable agreement with the theoretical product of disubstitution of the nitrourea, for example the compound N,N'-bis(difluoraminomethyl)-N'-nitrourea which requires 15.3% carbon, 2.1% hydrogen, 29.8% nitrogen and 32.3% fluorine.

*Example 7*

A mixture of 0.2 part mono ethyl urea and 0.2 part of paraformaldehyde was refluxed at −80° C. under a nitrogen atmosphere for 2 hours with 4 parts difluoramine. 2 parts 96 percent sulphuric acid were added dropwise over 5 minutes to the mixture, difluoramine reflux was continued for a further 6 hours, and the product was isolated as described in Example 1. The product was 0.4 part of a hygroscopic white solid having a melting point of 52–53° C. It was found to contain 28.1% carbon, 4.8% hydrogen, 26.3% nitrogen and 31.9% fluorine. N,N' - bis(difluoraminomethyl) - N - ethylurea had a theoretical composition of 27.5% carbon, 4.6% hydrogen, 25.7% nitrogen and 34.9% fluorine.

*Example 8*

A mixture of 1 part methoxy urea and 2.5 parts paraformaldehyde was refluxed at −80° C. under a nitrogen atmosphere for 6 hours with 10 parts difluoramine. 10 parts of 96 percent sulphuric acid were then added and the difluoramine reflux continued for a further 2 hours, and the product was isolated as described in Example 1. The product was a gum which was found on analysis to contain 22.7% carbon, 4.5% hydrogen, 24.7% nitrogen, 31.9% fluorine and 14.1% methoxyl groups. This analysis was in reasonable agreement with the theoretical composition of the compound N-methoxy-N,N'bis(difluoraminomethyl) urea, which requires 21.8% carbon, 3.6% hydrogen, 25.4% nitrogen, 34.6% fluorine and 14.1% methoxyl groups.

*Example 9*

A mixture of 0.5 part of N,N-difluorourea and 1.0 part of difluoraminomethanol (prepared by refluxing difluoramine on to paraformaldehyde) was cooled to 0° C. 9 parts of 96 percent sulphuric acid were added slowly with stirring. After 30 minutes the mixture was poured on to 40 parts of crushed ice and the aqueous mixture extracted with diethyl ether. Treatment of the ethereal solution as described in Example 1 gave 0.6 part of a "wet" gum. Elemental analysis of this crude product gave 21.7% nitrogen and 34.9% fluorine. N'-difluoraminomethyl-N,N-difluorourea dihydrate requires 21.3% nitrogen and 38.5% fluorine; the trihydrate requires 19.5% nitrogen and 35.4% fluorine.

*Example 10*

5 parts of difluoramine were refluxed for 6 hours on to a solid mixture of 0.43 part of imidazolidine-2-one and 0.33 part of paraformaldehyde. 5 parts of 96 percent sulphuric acid were added and difluoramine reflux continued for a further 4 hours. Excess difluoramine was vented off in a stream of nitrogen, the product mixture poured on to 40 parts of ice and the aqueous solution extracted 3 times with 10 parts of diethyl ether. The ethereal layer was washed with aqueous sodium bicarbonate solution, then with water and finally dried over anhydrous sodium sulphate. Evaporation of the ether left a small amount of a yellow viscous liquid which, on gas-liquid chromatographic analysis, gave rise to only one peak. Elemental analysis of the liquid gave 28.2% carbon, 3.8% hydrogen, 25.9% nitrogen and 32.8% fluorine. This is in reasonable agreement with the theoretical composition of the compound, 1,3-bis(difluoraminomethyl)imidazolidine-2-one which requires 27.8% carbon, 3.7% hydrogen, 25.9% nitrogen and 35.2% fluorine.

*Example 11*

4 parts of difluoramine were refluxed at −80° C. on to a solid mixture of 0.5 part of glycoluril and 0.5 part of paraformaldehyde for 4 hours. 5.4 parts of 96 percent sulphuric acid were then added and difluoramine reflux continued for a further 4 hours. Excess difluoramine was blown off in a stream of nitrogen and the reaction mixture poured on to 100 parts of crushed ice. A white precipitate settled out, was filtered off, washed with water and dried under vacuum over $P_2O_5$ to give 0.4 part of white solid M.P. 155° C. Elemental analysis of the product gave 24.1% carbon, 3.0% hydrogen, 28.1% nitrogen and 36.9% fluorine. Tetrakis(difluoraminomethyl)glycoluril requires 23.9% carbon, 2.5% hydrogen, 27.9% nitrogen and 37.8% fluorine.

*Example 12*

A mixture of 0.6 part nitroguanidine and 0.5 part paraformaldehyde was treated as described in Example 1 with 4 parts difluoramine and 5 parts of 96 percent $H_2SO_4$. Treatment of the residual mixture as described in Example 1 gave 0.2 part of a yellow powder, M.P. 68–75° C., the infra-red spectrum of which showed absorption bands in the 10–12μ region. Analysis of the powder showed that it contained 22.0% carbon, 3.5% hydrogen, 32.9% nitrogen, 34.7% fluorine and 4.7% fluoride ion. N,N'-bis(difluoraminomethyl)-N-nitroguanidine,

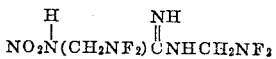

requires 15.4% carbon, 2.6% hydrogen, 35.9% nitrogen and 32.5% fluorine.

*Example 13*

4 parts difluoramine were refluxed at −80° C. on to a solid mixture of 2 parts of acetohydroxamic acid and 1 part of paraformaldehyde for 3 hours under a nitrogen atmosphere. 3 parts of 96 percent $H_2SO_4$ were added dropwise over a period of 10 minutes to the reaction mixture and difluoramine reflux continued for a further 6 hours. Excess difluoramine was allowed to vent off in a slow stream of nitrogen and the reaction product mixture poured over 100 parts of crushed ice. The aqueous mixture was extracted 4 times with 25 parts of diethyl ether and the ethereal solution was dried for 24 hours over anhydrous sodium sulphate. The ether was then removed under atmospheric pressure leaving 0.3 part of a colourless crystalline product. This product had a melting point of 93–94° C. and elemental analysis showed it to contain 25.8% carbon, 4.5% hydrogen, 19.1% nitrogen and 27.4% fluorine. This analysis was in accord with the theoretical composition of the compound N-(difluoraminomethyl)acetohydroxamic acid

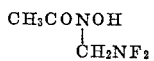

which requires 25.7% carbon, 4.3% hydrogen, 20.0% nitrogen and 27.1% fluorine.

*Example 14*

4 parts of difluoramine were refluxed for 4 hours at −80° C. under an atmosphere of nitrogen on to a mixture of 1 part of ethyl carbamate and 0.7 part of paraformaldehyde. 5 parts of 96 percent $H_2SO_4$ were added dropwise over a period of 10 minutes and difluoramine reflux continued for a further 6 hours. 0.5 part of a clear, colourless liquid was isolated in the manner described in Example 1. Elemental analysis showed that the liquid product contained 30.7% carbon, 4.8% hydrogen, 18.0% nitrogen and 26.2% fluorine. This was in reasonable agreement with the theoretical composition of the compound ethyl N-difluoraminomethyl carbamate $NF_2CH_2NHCOOEt$ which requires 31.2% carbon, 5.2% hydrogen, 18.2% nitrogen and 27.4% fluorine.

*Example 15*

4 parts of difluoramine were refluxed for 4 hours at −80° C. under an atmosphere of nitrogen on to a suspension of 0.4 part of paraformaldehyde in 1 part of ethyl N-fluorocarbamate. 4 parts of 96 percent $H_2SO_4$ were added dropwise over a period of 10 minutes and difluoramine reflux continued for a further 5 hours. 0.4 part of a clear, colourless liquid was isolated in the manner described in Example 1. The liquid product was found on elemental analysis to contain 31.3% carbon, 5.2% hydrogen, 17.3% nitrogen and 27.7% fluorine. Ethyl N-difluoraminomethyl-N-fluorocarbamate requires 27.9% carbon, 4.1% hydrogen, 16.3% nitrogen and 33.1% fluorine.

*Example 16*

5 parts of difluoramine were refluxed for 8 hours on to a solid mixture of 0.55 part of tris(carbethoxyamino)methane and 0.22 part of paraformaldehyde. 5 parts of 96 percent sulphuric acid were added and difluoramine reflux continued for a further 4½ hours. Excess difluoramine was allowed to vent off under an atmosphere of nitrogen and the residual mixture poured on to 40 parts of crushed ice. The aqueous solution was extracted 3 times with 10 parts of diethyl ether, the ethereal solution dried over anhydrous sodium sulphate and the ether removed by evaporation at room temperature to yield 0.5 part of a yellow liquid. Elemental analysis of this product gave 29.8% carbon, 5.1% hydrogen, 14.9% nitrogen and 23.6% fluorine. N,N',N" - tris(difluoraminomethyl)tris(carbethoxyamino)methane requires 33.1% carbon, 4.7% hydrogen, 17.8% nitrogen and 24.2% fluorine.

*Example 17*

A mixture of 0.5 part nitramine and 0.45 part paraformaldehyde was refluxed at −80° C. under an atmosphere of nitrogen for 4 hours with 5 parts difluoramine. 5 parts of 96 percent $H_2SO_4$ were then added and the difluoramine reflux continued for a further 5 minutes. 0.4 part of a yellow-brown liquid product was isolated by the method described in Example 1. Analysis of the product gave 13.9% carbon, 3.1% hydrogen, 30.2% nitrogen and 33.7% fluorine. N,N - bis(difluoraminomethyl)nitramine, $NO_2N(CH_2NF_2)_2$, requires 12.5% carbon, 2.1% hydrogen, 29.2% nitrogen and 39.6% fluorine.

*Example 18*

4 parts of difluoramine were refluxed for 4 hours on to a mixture of 1.0 part of methylene dinitramine and 1.3 parts of 37 percent aqueous formaldehyde solution. 7.3 parts of 96 percent sulphuric acid were then added dropwise and difluoramine reflux continued for a further 4 hours. The product was isolated as described in Example 1. After recrystallisation from alcohol, 0.6 part of a white solid, M.P. 89° C., was obtained which was shown by elemental analysis to contain 16.0% carbon, 3.0% hydrogen, 30.2% nitrogen and 31.2% fluorine. This analysis was in reasonable agreement with the theoretical composition of the compound N,N' - bis(difluoraminomethyl)methylene dinitramine which requires 13.5% carbon, 2.6% hydrogen, 31.5% nitrogen and 28.5% fluorine.

What we claim is:

1. Compounds of the general formula

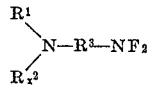

where:
R¹ is selected from the group consisting of monovalent and divalent atoms and groups having an electron attracting atom or group adjacent the nitrogen atom,
R² is selected from the group consisting of R¹, hydrogen, hydroxyl, alkyl, aryl, alkoxy and the atoms necessary to form with R¹ a cyclic ring containing nitrogen and carbon atoms in the ring,
$x$ is 0 or 1 as R¹ is an integer selected from the group consisting of 0 and 1 and is 0 when R¹ is divalent and is 1 when R¹ is monovalent,
R³ is selected from the group consisting of an alkylene group, a difluoraminoalkylene group and a nitroalkylene group and
R¹, R² and R³ are such that the ratio of carbon atoms to difluoramino groups is not more than 6:1.
2. N,N'-bis(difluoraminomethyl)urea.
3. Tris(difluoraminomethyl)urea.
4. Tetrakis(difluoraminomethyl)urea.
5. N-(difluoraminomethyl)acetohydroxamic acid.
6. Ethyl N-difluoraminomethyl carbamate.
7. Ethyl N-difluoraminomethyl-N-fluoro carbamate.
8. N-difluoraminoethyl-N'-nitrourea.
9. N,N'-bis(difluoraminomethyl)-N'-nitrourea.
10. Tetrakis(difluoraminomethyl)glycoluril.
11. 1,3-bis(difluoraminomethyl)imidazolidine-2-one.
12. N'-difluoraminomethyl-N,N-difluorourea.
13. N-methoxy-N,N'-bis(difluoraminomethyl)urea.
14. N,N'-bis(difluoraminomethyl)-N-nitroguanidine.
15. N,N',N" - tris(difluoraminomethyl)tris(carbethoxyamino)methane.

16. A process for the preparation of a difluoramine compound as claimed in claim 1 wherein a compound containing an NH group and having the general formula $R^1NHR_x^2$ is reacted with a difluoramino alcohol having the general formula $HO-R^3NF_2$ in the presence of a substance selected from the group consisting of strongly water-absorbent substances and strongly water-reactive substances, $R^1$, $R^2$, $R^3$ and $x$ having the meanings given in claim 1.

17. A process as claimed in claim 16 wherein the compound containing the NH group is selected from the group consisting of urea, nitrourea, acetohydroxamic acid, ethyl carbamate, ethyl N-fluorocarbamate, glycoluril, imidazolidine-2-one, N,N-difluorourea, methoxyurea, and nitroguanidine.

18. A process as claimed in claim 16 wherein the difluoramino alcohol is prepared in situ from difluoramine and aldehyde.

19. A process as claimed in claim 18 wherein difluoramine, the aldehyde, and the compound containing the NH group are refluxed together to form the difluoramino alcohol before addition of the water-absorbent or water-reactive substance.

References Cited
UNITED STATES PATENTS

| | | | |
|---|---|---|---|
| 2,861,990 | 11/1958 | Cleaver et al. | 260—244 |
| 2,915,528 | 12/1959 | Raifsnider | 260—309.6 |
| 3,248,394 | 4/1966 | Andreades | 260—244 |

JOHN D. RANDOLPH, *Primary Examiner.*

B. A. PADGET, REUBEN EPSTEIN, *Examiners.*

L. SEBASTIAN, N. TROUSOF, *Assistant Examiners.*